United States Patent [19]

Boyer et al.

[11] 4,360,440

[45] Nov. 23, 1982

[54] INSULATING FIBER MIXTURE, ADHESIVE, AND PROCESS

[75] Inventors: Harold F. Boyer, Houston; John L. Webb, Richmond, both of Tex.

[73] Assignee: Fulbright & Jaworski, Houston, Tex.

[21] Appl. No.: 263,225

[22] Filed: May 13, 1981

[51] Int. Cl.$^3$ .......................... C04B 43/00; E04B 1/74
[52] U.S. Cl. ...................................... 252/62; 427/421; 428/446; 428/500; 524/543
[58] Field of Search ............... 260/29.65, 42.13, 42.15; 428/446, 500; 427/421; 252/62; 524/543

[56] References Cited

U.S. PATENT DOCUMENTS

| | | | |
|---|---|---|---|
| 4,185,001 | 1/1980 | Machurat et al. | 260/42.13 X |
| 4,185,135 | 1/1980 | Huff | 260/29.65 |
| 4,294,874 | 10/1981 | Howe | 260/29.65 |

OTHER PUBLICATIONS

Bulletin N-90 Celanese CL-300 Acrylic Polymer Emulsion, Jan. 9, 1962 (p. 4).
Celanese Poly-Tex CL-303 in Adhesives Bulletin No. 1867, (p. 2).
Thermo-Coustics Manufacturing TCI-75 1979.
Operations Manual TCI-75 Spray-On System, Jan. 1979, (pp. 13-14 especially).
Thermo-Coustics Application Guides Apr. 1975.
Diamond Shamrock Sodium Silicate Handbook 1979, (p. 20 especially).
National Cellulose Corporation K-13 Spray-On Systems Application Manual 1979.
Celanese Resins Product Line.

*Primary Examiner*—Michael R. Lusignan
*Attorney, Agent, or Firm*—Fulbright & Jaworski

[57] ABSTRACT

A fiber adhesive is provided which is a mixture of sodium silicate and an acrylic resin, as well as a method for preparing the adhesive and spraying a mixture of the adhesive and the fiber.

4 Claims, No Drawings

INSULATING FIBER MIXTURE, ADHESIVE, AND PROCESS

BACKGROUND OF THE INVENTION

1. Field of the Invention

This invention relates to adhesives used in the spraying of insulating fibers.

2. Description of the Prior Art

In the art of spraying fibers with adhesives onto a surface such as a wall or ceiling, it is desirable to produce a product which is flame retardant; fast drying and quick setting; strong; flexible; resistant to mildew, corrosion, and condensation; able to be applied in desired thicknesses and to a variety of substrates; and having desired color characteristics. No prior art process, method, device, or composition teaches or suggests a product with these characteristics.

In spraying fibers, the spray itself is made up of two primary components—the fibers and an adhesive. Adhesives are generally water-based. The adhesive/water mixture keeps the fibers in place in a manner similar to the way in which saliva maintains the integrity of a "spit ball" until the adhesive sets. A typical prior art adhesive is Sodium Silicate such as Grade 40 or 42. This adhesive has proven to be unacceptable. The product resulting from a spray using this Sodium Silicate as an adhesive is brittle and non-flexible and does not withstand the expansion and contraction of the substrate to which the spray is applied. This product lacks cohesive strength and falls out in flakes and chunks. Also this product has an undesirable yellow color and is especially undesirable when utilized in exposed interior applications.

Other prior art adhesives are acrylics, vinyl acrylic, and polyvinyl acetates. These are all used as water-based adhesives. Such adhesives are not fire-resistant or flame-retardant. On the contrary, they are highly combustible and contribute to rather than inhibit a fire. One solution to the problems associated with the fire-enhancing characteristics of these adhesives was to overspray the final product with a material such as Sodium Silicate or Anhydrous Boric Acid in a water solution.

With an acrylic adhesive the maximum thickness which could be sprayed onto a celing for one setting was approximately two and a half inches; but at this and at lesser thicknesses there were often areas of fallout or "patties." The strong interlocking and adhesion of the fibers would not occur until the product dried to a moisture content of about 15%. At this low moisture content acrylics would be inhibited from returning into solution and would not set properly. Prior to reaching the 15% moisture content level, the acrylics could be washed out of the product by water from condensation or water leaks. One attempt to maintain the acrylics in the product involved the addition of aluminum sulfate to the fibers. This made the acrylics coalesce into a stringy film and prevented the acrylic film from migrating through the fibers. The resultant product was unacceptable because of thickness limitation and because acrylics are combustible.

A product utilizing an acrylic as an adhesive exhibited the following flame and smoke characteristics:

| | |
|---|---|
| Flame Spread | 20 |
| Fuel Contributed | 10 |
| Smoke Developed | 0 | where untreated red oak has a rating of 100 for all three categories and where asbestos cement board has a rating of 0 for all three categories.

Other prior art adhesives include acrylic emulsion, polyvinyl chloride, polyvinyl acetate, acrylic esters, and vinylidene chloride copolymer, all of which exhibit some or all of the problems and limitations already discussed.

SUMMARY OF THE INVENTION

The present invention provides an improved adhesive that exhibits increased fire-retardancy and flame-resistancy as well as unexpected color characteristics and thickness characteristics. According to the present invention an adhesive is provided which includes both an acrylic such as an Acrylic Resin and Sodium Silicate mixed together to form a novel adhesive. Such an adhesive exhibits the good points of both Sodium Silicate and of Acrylic Resins while reducing the effect of the undesirable characteristics of each used alone as an adhesive.

Although Sodium Silicate and Acrylic Resins are generally regarded as immiscible, and although even when such mixing is attempted the two ingredients usually will separate from each other, it was found that if they were agitated together sufficiently in certain proportions an excellent homogeneous adhesive could be formed which, if sprayed with fibers, overcomes the problems of the prior art.

The resulting product has increased flexibility, increased surface flame retardancy and increased fire resistancy. The flame spread index and fuel contribution factor is dramatically improved. Also the resulting product can be sprayed on a substrate ceiling to a thickness up to 6" for a single setting, nearly tripling the average capability of the prior art products. Also the product enhances white and near-white colors.

It is therefore an object of the present invention to provide an adhesive for use in fiber spraying that is efficient, safe, strong, flexible and long-lasting.

Another object of the present invention is the provision of such an adhesive which can be used in producing a product with enhanced surface fire-retardance and flame-resistance as well as decreased fuel and smoke contribution.

Yet another object of the present invention is the provision of such an adhesive and resultant product which exhibits increased thickness capability.

Still another object of the present invention is the provision of such an adhesive which results in a product having a stabilized and enhanced color.

A further object of the present invention is the provision of an adhesive that eliminates the need for an overspray of the product.

A still further object of the present invention is the provision of an adhesive which is used to produce a product which is resistant to corrosion, mildew, humidity, or condensation.

An additional object of the present invention is the provision of such an adhesive which can be used to produce a product which can be applied to a wide variety of substrates including but not limited to glass, metal, wood, foam, urethane, gypsum or already existing sprayed fiber product.

Other and important objects, features, and advantages of the present invention will be apparent to one of skill in the art from the following description of presently preferred embodiments of the invention, given for the purpose of disclosure.

DESCRIPTION OF THE PREFERRED EMBODIMENT

In general, the sprays for insulating an object from noise or from temperature effects are composed of fibers, adhesives and water. It has been found that treated fibers perform much better than untreated fibers. The preferred mixture of treated fibers employed in the present invention is composed of about 76% fiber and about 24% treating material (by weight). The treating material is about 50% boric acid, about 33% borax and about 17% aluminum sulfate. The preferred fiber is cellulose fiber. Treating the fiber is desirable because many fibers such as cellulose are combustible and treatment reduces this combustability rendering the fiber more fire resistant.

According to the preferred embodiment of the present invention, the adhesive is a mixture of Sodium Silicate and an Acrylic Resin. The major suppliers of Sodium Silicate are Diamond Shamrock and Philadelphia Quartz. A variety of grades of Sodium Silicate can be used. The preferred Sodium Silicate is one that has a weight ratio $Na_2O:2.92SiO_2$ and a solid content of about 41% by weight. A variety of Acrylic Resins can be used in the present invention, including but not limited to National Starch E 3223-9 and 6105; Amsco 4125; Western Adhesive M2247; and Rohm & Haas E-1091 and E-1612. The Amsco resin CCR 6326 is the preferred Acrylic Resin which is stabilized with anionic surfactants and has a solid content of about 46% by weight. It has been determined that a mix of about 60% resin to about 40% sodium silicate by volume produces the best results. Varying this ratio of Resin to Sodium Silicate is not outside the scope of the present invention, but best results are obtained when this ratio is maintained.

The new adhesive is then mixed with water prior to mixing it with fibers. It has been found that the best results are obtained when the new adhesive-to-water ratio is about 1.0 to 3.5 by volume, that is, about 22% adhesive and about 78% water by volume. Varying these percentages is not outside the scope and spirit of the present invention; but it has been found that best results are obtained with these percentages. Conventional agitation and mixing means can be employed to physically mix the adhesive mixture. It has been determined that the best results can be obtained by combining the water, fiber and adhesive in the following percentages, by weight: about 50% water, about 33% fiber, and about 17% adhesive mixture. It has been determined that about one pound of fiber in combination with one-fourth of a gallon of adhesive mixture works well, the preferred amounts being one pound of fiber to 0.23 gallons of adhesive mixture. Varying these percentages is not outside the scope of the present invention, but best results are obtained when these percentages are observed.

Application is accomplished by providing a container for mixing together the adhesive components, Sodium Silicate and Acrylic Resin. Then the adhesive is mixed with water, fiber is added, and the resulting water-adhesive-fiber mixture is introduced into an application apparatus such as a spray apparatus for spraying material onto an object. With certain types of application apparatuses the water-adhesive mixture is not pre-mixed with the fiber, but the water-adhesive mixture is introduced through one line and the fiber is introduced through another line.

At a 2" thickness a water-fiber-adhesive spray utilizing the new adhesive according to this invention has exhibited the following excellent flame, fuel, and smoke characteristics:

| Flame Spread | 10 |
|---|---|
| Fuel Contributed | 0 |
| Smoke Developed | 0 |

The present invention, therefore, is well adapted to carrying out the objects and attain the ends and advantages mentioned as well as those inherent therein. While presently preferred embodiments of the invention have been given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. A process for applying an insulating mixture onto an object and for thereby building-up the insulating mixture on the object to a desired thickness, the process including
    mixing together in a container a fiber adhesive mixture of about 40% sodium silicate and about 60% acrylic resin and agitating them together sufficiently to form a homogenous mixture,
    mixing water with the adhesive mixture in a container so that the ratio of water to adhesive mixture is about 3.5 to 1 by volume,
    mixing insulating fiber with the adhesive-water mixture so that the ratio of fiber to adhesive-water mixture is about 1 lb. fiber to about ¼ gallon adhesive-water mixture,
    introducing the fiber-water-adhesive mixture into an application apparatus, and
    applying the fiber-water-adhesive mixture onto an object to a desired thickness.

2. An insulating mixture for spraying onto an object to insulate the object and for thereby building up the insulating mixture on the object to a desired thickness, the insulating mixture comprising
    about 50% water,
    about 17% adhesive, the adhesive comprising about 40% sodium silicate and about 60% acrylic resin agitated together sufficiently to form a homogeneous mixture, and
    about 33% cellulose fiber.

3. An insulating mixture for spraying onto an object to insulate the object and for thereby building up the insulating mixture on the object to a desired thickness, the insulating mixture comprising about 50% water by weight, about 33% insulating fiber by weight and about 17% fiber adhesive by weight,
    the fiber adhesive comprising a mixture of sodium silicate and an acrylic resin, and the adhesive formed by sufficiently agitating the sodium silicate and acrylic resin together to form a homogeneous mixture.

4. A process for preparing an insulating mixture including the steps of
    providing a container
    mixing together in the container water, an adhesive including sodium silicate and an acrylic resin, and fiber,
    wherein the insulating mixture comprises about 50% water, about 33% fiber, and about 17% adhesive by weight.

* * * * *

UNITED STATES PATENT OFFICE
CERTIFICATE OF CORRECTION

Patent No. 4,360,440              Dated Nov. 23, 1982

Inventor(s) Harold F. Boyer and John L. Webb

It is certified that error appears in the above-identified patent and that said Letters Patent are hereby corrected as shown below:

Front Page of Patent, Item [73] Assignee

Delete "Fulbright & Jaworski, Houston, Tex."

Add -- National Cellulose Corporation, Houston, Texas --

Signed and Sealed this

Seventh Day of May 1985

[SEAL]

Attest:

DONALD J. QUIGG

Attesting Officer    Acting Commissioner of Patents and Trademarks